March 7, 1939. W. MORTON 2,149,861
WELDING APPARATUS
Filed April 24, 1935
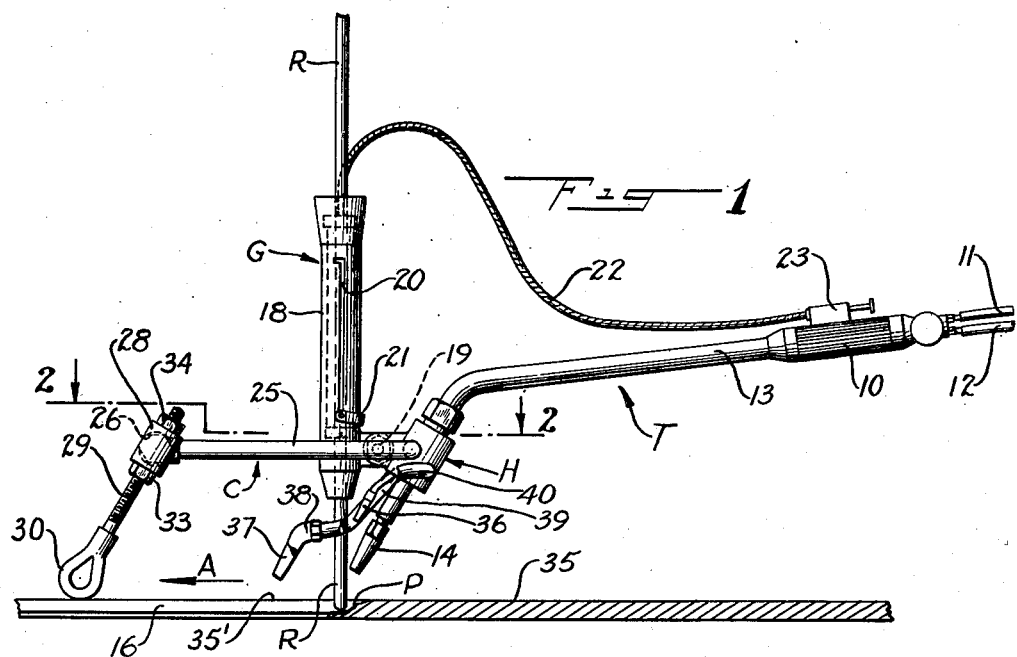
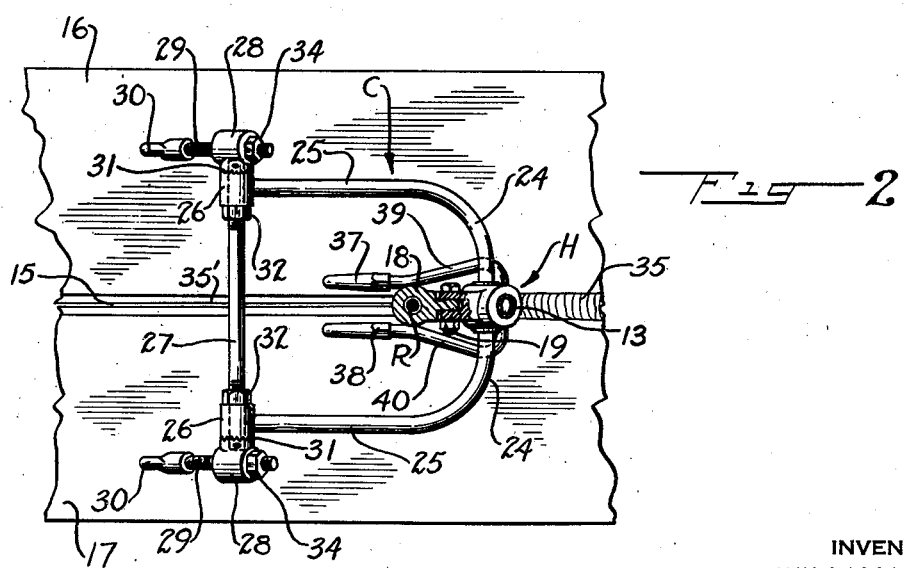
INVENTOR
WILLIAM MORTON
BY
ATTORNEY Patented Mar. 7, 1939

2,149,861

UNITED STATES PATENT OFFICE 2,149,861

WELDING APPARATUS

William Morton, Niagara Falls, N. Y., assignor, by mesne assignments, to Union Carbide and Carbon Corporation, a corporation of New York Application April 24, 1935, Serial No. 17,932

6 Claims. (Cl. 113—59)

This invention relates to welding, and has for its object the provision of an improved welding apparatus for uniting together the contiguous edges of metallic members.

In the drawing Fig. 1 is a side elevation of welding apparatus embodying this invention; and Fig. 2 is a plan view taken at line 2—2 of Fig. 1, to illustrate more clearly parts of the apparatus.

Referring to the drawing, the manually operable welding apparatus which I have shown embodying this invention comprises a welding torch T having a gas mixing handle 10 to which may be supplied through tubes 11 and 12, oxygen and acetylene gases. The combustible gas, such as the mixture of oxygen and acetylene, is delivered through a stem 13 to a welding head H to which is secured a suitable welding nozzle or tip 14 to provide a main welding flame. The handle 10 and stem 13 are normally maintained in a substantially horizontal position, and the front end of the stem is inclined downwardly and away from the handle, so that the flame produced by the tip 14 is directed at an acute angle to the groove 15 formed at the opposed beveled edges of plates 16 and 17 that are to be united.

At the point of impingement of the welding flame on the groove 15 a molten welding puddle P is formed by a welding rod R, the lower end of which contacts the groove 15 and is also impinged by the welding flame to cause fusion thereof. The welding rod R is preferably maintained in a substantially vertical position so that the rod will feed by gravity, and it may be guided toward the groove in any suitable manner. As shown, a welding rod guide G comprising a tube 18, having an opening therethrough, is provided to guide the welding rod R toward the groove, such tube 18 being pivotally connected at 19 to the welding head H. The tube 18 may be provided with diametrically opposed slots 20 extending longitudinally thereof, and through these slots and into the opening of the tube 18 extend the lugs of a semi-circular shaped yoke 21. When the yoke 21 is in a substantially horizontal position, the ends of the lugs are spaced from the peripheral surface of the welding rod R; and when the yoke is tilted from this horizontal position the lugs will grip the welding rod. By providing suitable mechanism to tilt and raise the yoke 21 the welding rod can be retracted from the welding puddle P. Such mechanism may comprise a Bourdon wire control 22 having one end thereof connected to the yoke and extending parallel to the tube 18 for a short distance, and having the opposite end thereof connected to a control mechanism 23 mounted on the handle 10. When desired, the control mechanism 23 can be operated to tilt the yoke and raise the same to retract the welding rod; and it may also be operated to permit the yoke to assume a position in a horizontal plane and thus allow the welding rod to be fed by gravity to the welding puddle. The welding rod guide and control mechanism of the character just described are fully disclosed and claimed in United States Letters Patent No. 1,994,700, granted on an application of John M. Halbing and Robert J. Kehl.

The welding head H, the rod guide G, and handle 10 are disposed in the same plane and, during welding, the apparatus is so positioned that the welding head and rod guide are in alignment with the groove 15 being welded. The welding head H and rod guide G are mounted on a carriage C comprising a pair of L-shaped members having their short arms 24 secured to the welding head H. These short arms 24 are disposed substantially transverse to the plan formed by the welding head H and rod guide G, and the long arms 25 of the L-shaped members are substantially parallel to the handle 10 and extend in a direction opposite to that of the handle. To the extreme ends of the spaced arms 25 are secured heads 26 having openings through which extends a cross bar 27 having heads 28 secured to its ends. The heads 28 are provided with threaded openings for receiving the upper threaded ends of runners 29, the lower ends 30 of which are rounded and curved and adapted frictionally to contact and slide along the work, such as the plates 16 and 17. The runners 29 are maintained in the same plane transverse to the direction of movement of the apparatus, and are angularly movable simultaneously to vary the relative position of the runners on the apparatus. The heads 26 and 28 are provided with coacting milled surfaces, as indicated at 31. By tightening the lock nuts 32 the runners 29 can be secured in any desired angular position with respect to the carriage C. Each of the runners 29 is axially adjustable in its respective head 28, and may be maintained in any desired axial position through lock nuts 33 and 34 adapted to bear against the upper and lower ends of the heads 28.

In accordance with the present invention, the apparatus is adapted to be manually moved with respect to the plates 16 and 17 in the direction of the arrow A. The frictional sliding contact of the runners 29 upon the work tends to steady the apparatus and enables a welder to obtain close control during welding thus insuring proper fusion and penetration of the added weld metal. The runners 29 form a two point support in parallel planes spaced from and on each side of the seam or groove 15, and the handle 10, which is adapted to be grasped by the welder, forms the third point of support for the apparatus. Since the welding head H is spaced longitudinally of the apparatus from the runners 29, any rocking movement of the handle 10 about the fulcrum provided by the runners 29 produces a correspondingly smaller movement of the nozzle 14 to and from the work. This effects a simple and steady control of the high-temperature welding heat on the welding region in the groove 15.

As the apparatus is moved relatively to the plates 16 and 17 from the welded portion 35 to the unwelded portion 35' of the groove 15, the tip of the welding rod is preferably contacting and sliding along the groove. At any time during welding the welding rod can be retracted from the welding puddle P by properly manipulating the control mechanism, as described above.

To increase the rate of deposition of the weld metal and hence the welding speed, a nozzle or tip 36 is provided to preheat the welding rod R before it reaches the welding region. The tip 36 is smaller than the tip 14 and is also secured to the welding head H. In the present embodiment the tip 36 is substantially parallel to the tip 14 and disposed above it in the same plane as the guide G and head H.

The flame produced by the tip 36 contacts the welding rod R and is deflected downward along the rod toward the welding puddle P, thereby aiding the main welding flame which also is deflected by the tip of the welding rod and flows downward upon the welding region including the welding puddle P.

Since the welding rod R intercepts and deflects the main welding flame produced by the tip 14, the opposed contiguous edges of the plates 16 and 17 in the unwelded portion of the groove 15 are not properly preheated. To overcome this difficulty and obtain satisfactory welding conditions, two preheating nozzles or tips 37 and 38 are provided to produce heating flames that preheat unwelded portions of the work ahead of the welding rod R and the welding puddle P. The tips 37 and 38 are arranged at an acute angle to the work, in the direction of the unwelded portion of the groove 15, and are preferably in the same plane transverse to the groove 15. The tips 37 and 38 may be connected through tubular members 39 and 40 to the welding head H, so that all of the tips may be supplied with combustible gas from the same single source of supply. It will be seen that with this arrangement the tips 37 and 38 and tubular members 39 and 40 will embrace the welding rod during a welding operation, as clearly shown in Fig. 2. To promote faster welding and maintain a unidirectional flow of the combustible gas, the tips 37 and 38 and main welding tip 14 are arranged substantially parallel to each other.

With the above-described construction the line of contact of the runners 29 upon the work, the point of application of the preheating flames produced by the tips 37 and 38, the point of contact of the welding rod R upon the work, and the main welding flame produced by the tip 14, are arranged successively in the order named. The preheating flames preheat the contiguous edges of the plates 16 and 17 along the unwelded portion of the groove 15, thereby insuring proper welding conditions to produce welds which are strong and uniform in character.

Although the present invention is embodied in a particular form of welding apparatus, it will be apparent that other modifications will occur to those skilled in the art which do not depart from the spirit and scope of this invention.

What is claimed is:

1. Welding apparatus comprising, in combination, means adapted to deliver a welding jet at a welding point on the work; means adapted to deliver a plurality of preheating jets against an unwelded portion of the work on opposite sides of the line of welding ahead of said welding point; means for guiding a welding rod to said welding point between said welding jet and said preheating jets, and a carrier for the three aforesaid means, said carrier including means adapted to engage the surface of the work only at a point substantially ahead of the point of impingement of said preheating jets and also adapted to support at least a portion of the weight of the apparatus on the work.

2. Welding apparatus as claimed in claim 1, wherein the means which delivers the preheating jets is normally so positioned and inclined, relatively to the work during welding, that the preheating jets are delivered obliquely against and forwardly along unwelded portions of the work as the welding advances; and the work-engaging means on the carrier provides a fulcrum along a line of contact crossing successive unwelded portions of the work, about which fulcrum said carrier and the several means thereon may be rocked to vary both the position of the welding jet and the position of the preheating jets relatively to the work.

3. Welding apparatus as claimed in claim 1, wherein the means which delivers the plurality of preheating jets comprises a pair of jet-delivering tips located ahead of the welding point at opposite sides of the line of welding.

4. Welding apparatus as claimed in claim 1, wherein the work-engaging means on the carrier comprises relatively widely spaced runners adapted to engage the work on opposite sides of the line of welding, and wherein said preheating means comprises relatively closely spaced tips adapted to be positioned adjacent opposite sides of the line of welding and adapted to direct preheating jets forwardly along the work and between said runners.

5. Welding apparatus as claimed in claim 1, wherein the work-engaging means on the carrier comprises a plurality of members adapted, when said apparatus is in an operative position, frictionally to contact opposite sides of successive unwelded portions of the seam to be welded; said members being connected to said apparatus at points spaced from each other and axially and angularly adjustable in planes parallel to the line of welding.

6. Welding apparatus as claimed in claim 1 in which a welding-rod preheating tip is located between said welding jet means and said work-preheating jet means adapted to deliver a preheating jet on said welding rod above the welding point.

WILLIAM MORTON.